United States Patent [19]
Rehm et al.

[11] Patent Number: 6,166,923
[45] Date of Patent: *Dec. 26, 2000

[54] SWITCHED-MODE POWER SUPPLY

[75] Inventors: Markus Rehm, Villingen-Schwenningen; Thomas Riesle, Vöhrenbach; Gerard Rilly, Unterkirnach; Jose I. Rodriguez-Duran, Villingen-Schwenningen, all of Germany

[73] Assignee: Deutsche Thomson-Brandt GmbH, Villingen-Schwenningen, Germany

[*] Notice: This patent is subject to a terminal disclaimer.

[21] Appl. No.: 09/330,388

[22] Filed: Jun. 11, 1999

Related U.S. Application Data

[62] Division of application No. 08/961,360, Oct. 30, 1997.

[30] Foreign Application Priority Data

Nov. 7, 1996 [DE] Germany ............................ 198 45 926
Feb. 11, 1997 [DE] Germany ............................ 197 05 155

[51] Int. Cl.$^7$ .................................................. H02M 3/335
[52] U.S. Cl. .............................................. 363/19; 363/131
[58] Field of Search .................................. 363/16, 18, 19, 363/20, 21, 55, 97, 131, 132; 323/902

[56] References Cited

U.S. PATENT DOCUMENTS 4,370,701  1/1983  Western .
4,885,673  12/1989  Philippe .
5,390,100  2/1995  Palata .
5,499,175  3/1996  Noro .
5,515,256  5/1996  Yokoyama .

FOREIGN PATENT DOCUMENTS 0211300  2/1987  European Pat. Off. .
0525920  2/1993  European Pat. Off. .
3938172  5/1991  Germany .

OTHER PUBLICATIONS

Patent abstracts of Japan, vol. 018, No. 308, Jun. 1994 & JP 06062573, Mar. 4, 1994.

*Primary Examiner*—Adolf Deneke Berhane
*Attorney, Agent, or Firm*—Joseph S. Tripoli; Joseph J. Laks; Joseph J. Kolodka

[57]  ABSTRACT

The switched-mode power supply comprises a secondary winding and four diodes for producing two rectified voltages of the same polarity, one of which can be regulated. A connection of the unregulated voltage has connected to it a variable Zener diode as an error amplifier for transmitting a regulating signal to the primary side. The driver stage provides a pulse-width-modulated square-wave signal for driving the switching transistor which is arranged at a high potential between the operating voltage on the input side and a first connection of the primary winding. The second connection of the primary winding is connected with a Zener diode and provides a stabilized voltage for the driver stage. Arranged between the driver stage and the control electrode of the switching transistor there is a differentiating element which produces positive and negative switching voltages for controlling the switching transistor.

11 Claims, 1 Drawing Sheet

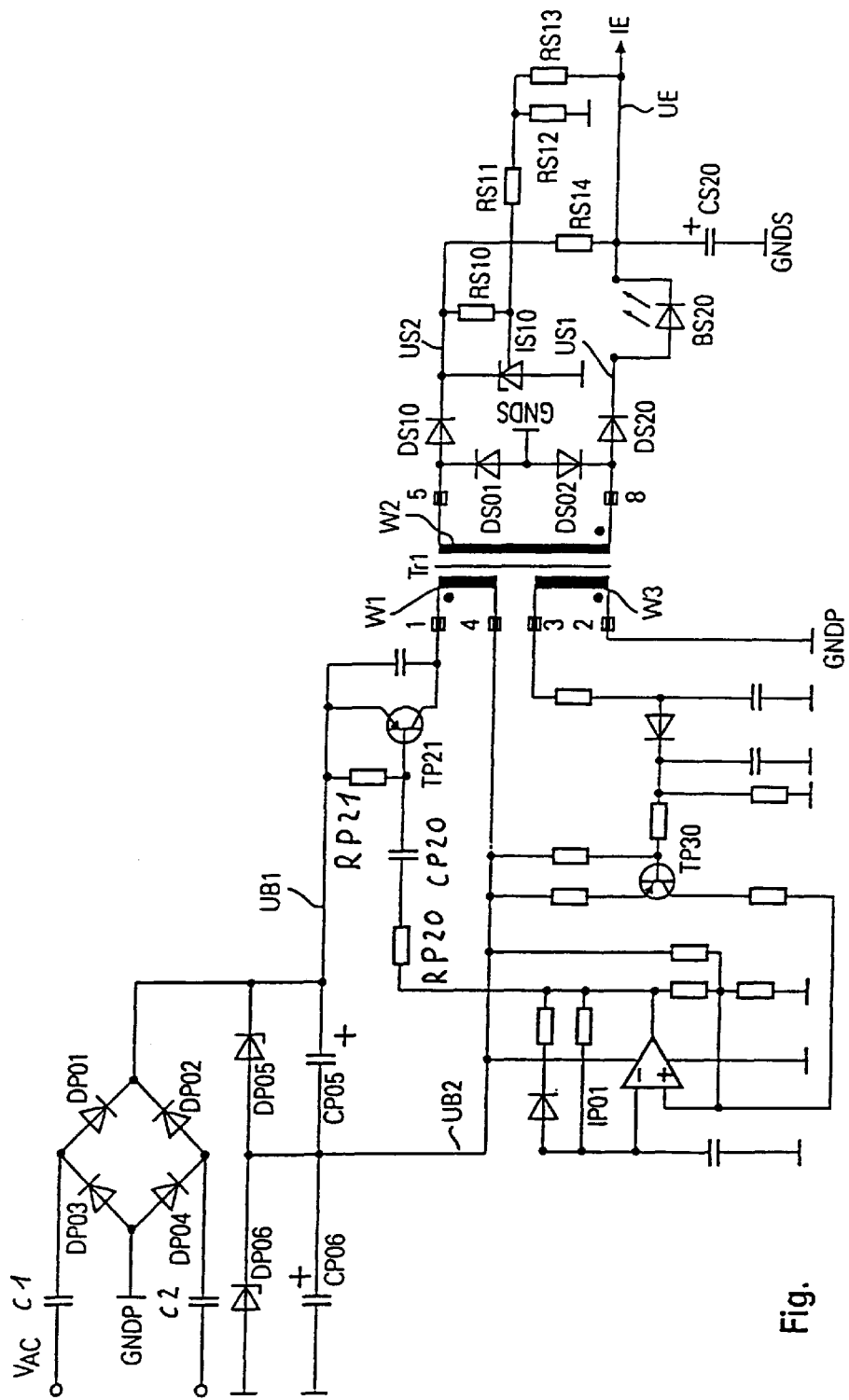
Fig.

SWITCHED-MODE POWER SUPPLY

This application is a division of USA Application Ser. No. 08/961,360 filed Oct. 30, 1997.

BACKGROUND OF THE INVENTION a. Field of the Invention

The invention is based on a switched-mode power supply which contains a switching transistor as well as an isolating transformer having a primary winding and a secondary winding.

b. Description of the Prior Art

These require a relatively high level of component complexity, particularly if regulation information must be transmitted from the secondary side to the primary side in order to stabilize an operating voltage on the secondary side. Various embodiments are known for transmitting this information, for example using an optocoupler. DE 40 04 707 discloses a circuit in which a regulating signal is transmitted back via a transistor stage in a brief time interval during a quiescent phase of the isolating transformer.

The object of the present invention is to reduce the component complexity for switched-mode power supplies of the type.

SUMMARY OF THE INVENTION

According to the invention, a secondary winding is used to produce two rectified voltages of the same polarity by a suitable circuit of four diodes. As a result of this circuit, the switched-mode power supply operates both as a forward converter and as a flyback converter. Both voltages can therefore be used as operating voltages, although only one can be stabilized in a regulated switched-mode power supply. However, the other can advantageously be used for transmitting regulation information from the secondary side to the primary side. A variable zener diode which is used as an error amplifier, for example the Type TL 431, is particularly suitable for this purpose. This zener diode has a control input which is connected by means of a suitable circuit, via a passive resistor network, to a secondary voltage to be regulated. Variation of the zener voltage of this zener diode allows the winding connected to it to be loaded to a greater or lesser extent so that this load can be tapped off via an auxiliary winding on the primary side of the isolating transformer.

The stabilized operating voltage, which is preferably used for supplying a load having a low power consumption, contains a series-connected light-emitting diode to indicate operation of relevant equipment. Since the light-emitting diode is connected downstream from the rectifier diode and upstream of a stabilization capacitor, it is operated at the pulsating switching frequency of the switched-mode power supply. At the high switching frequencies used here, the light-emitting diode has a very low power consumption of only, for example, 3 milliwatts; there is therefore no need for any resistor in series with the light-emitting diode.

According to a development of the invention, the control input of the switching transistor is driven by the driver stage via a differentiating element, the switching transistor being arranged between the operating voltage on the input side and the primary winding of the isolating transformer. Since this results in the control input being DC-decoupled, it can be connected via a resistor to the potential of the operating voltage on the input side.

The driver stage produces square-wave pulses for driving the switching transistor. The time constant of the differentiating element is chosen such that the switching transistor is switched off by a positive pulse flank and is switched on by a negative pulse flank. The output voltage of the switched-mode power supply can be regulated by varying the pulse width and/or the frequency.

Since the switching transistor is connected upstream of the primary winding of the isolating transformer in the current flow direction, that end of the primary winding which is at the lower potential can be used to produce a supply voltage on the primary side. This can be stabilized by means of a network which contains two zener diodes and at the same time provides the starting current for the driver stage.

The switched-mode power supply may have a very compact construction and, because of its low power consumption, is suitable in particular for use as a separate standby power supply for a television set or video recorder. In the standby mode, it drives, for example, only an infrared receiver and, for this purpose, requires a power consumption of less than 100 mW, including loads. This includes the light-emitting diode as an indication of operation, which is connected directly in the current path for supplying the infrared receiver.

Alternatively, the switched-mode power supply can advantageously be used to produce voltages with higher power levels, for example using further secondary windings, and one of these voltages can likewise be stabilized by means of the variable zener diode.

BRIEF DESCRIPTION OF THE DRAWING

The invention will be explained in the following text using, by way of example, a schematic drawing in which the FIGURE shows a circuit diagram of a switched-mode power supply designed according to the invention.

DETAILED DESCRIPTION OF THE INVENTION

The switched-mode power supply in the FIGURE contains a bridge rectifier having four diodes DP01–DP04 for producing an operating voltage UB1 on the input side from an AC voltage VAC. The operating voltage UB1 is stabilized by two series-connected zener diodes DP05 and DP06 in parallel with two series-connected capacitors CP05 and CP06. A supply voltage UB2 is at the same time stabilized via the mutually connected centre tap of these series circuits. Two reactive elements C1 and C2 considerably reduce the AC voltage applied to the bridge rectifier. In this exemplary embodiment, the operating voltage UB1 is 36 volts, and the supply voltage UB2 is 6 volts.

The operating voltage UB1 is connected to the emitter of a switching transistor TP21 whose collector is connected to the primary winding W1 of an isolating transformer Tr1. The second connection 4 of the primary winding W1, which is at a lower potential, is connected to the supply voltage UB2. The supply voltage UB2 is thus not only provided by the zener diode DP02 but is also obtained from the primary winding W1 by operation of the switching transistor TP21 and is stabilized by the zener diode DP06 and the capacitor CP06. The supply voltage UB2 is used to supply a driver stage IP01 and a transistor stage TP30.

In this exemplary embodiment, the driver stage IP01 is an oscillator in the form of an appropriately connected operational amplifier. It operates as an astable multivibrator and produces square-wave signals. The output of the driver stage IP01 is connected via a differentiating element to the control input of the switching transistor TP21. In this exemplary embodiment, the differentiating element comprises a series circuit formed by a resistor RP20 and a capacitor CP20, whose values are chosen such that they differentiate the switching flanks of the oscillator signal.

Connected in parallel with the emitter and the base of the switching transistor TP21 there is a resistor RP21 which is used to draw the base potential of said switching transistor TP21 to the operating voltage UP1 so that the switching transistor is in the switched-off state when there is no drive signal. Differentiation of the square-wave pulses results in suitable positive and negative pulses being produced alternately in order to switch the switching transistor TP21 on and off.

The isolating transformer TR1 contains a primary auxiliary winding W3 which is used to provide a regulating signal for stabilizing one or more secondary output voltages. This regulating signal is amplified in a transistor stage TP30 and is supplied to the oscillator IP01 in order to regulate the pulse width and/or the frequency.

The switched-mode power supply operates, for example, at an oscillator frequency of 100 kHz, which is governed by the oscillator IP01. Alternatively, the switched-mode power supply can be synchronized, for example over a frequency range of 40–150 kHz. With appropriate component values, the differentiating element can be matched to the desired oscillation frequency or an oscillation range.

The following values were used for relevant components for the drive level illustrated in the FIGURE:

RP20:4.7 kOhm
CP20:100 pF
RP21:47 kOhm

The switching transistor may also be, in particular, an MOS field-effect transistor which, because of its high-impedance gate input, can be controlled with very low switching currents.

The isolating transformer Tr1 of the switched-mode power supply contains one or possibly more secondary windings W2 for producing supply voltages. In this exemplary embodiment, a relatively small load IE, for example an infrared receiver of a television set or of a video recorder, is operated by means of a supply voltage US1. The secondary winding W2 is connected to four diodes DS01, DS02, DS10 and DS20 in such a manner that two voltages of the same polarity are produced, in this case two positive voltages US1 and US2, in that, at a first connection 5 of the secondary winding W2, a diode DS10 is connected in the forward direction to a load IS10 and a diode DS01 is connected in the reverse direction to earth GNDS and, at a second connection 8 of the secondary winding W2, a diode DS20 is connected in the forward direction to the load IE and a diode DS02 is connected in the reverse direction to earth GNDS. Alternatively, two rectified, negative voltages can be produced by reversing the polarity of the diodes DS01, DS02, DS10, DS20.

The isolating transformer Tr1 DC-decouples the earth GNDS and the earth GNDP.

The voltage US1 is smoothed by a capacitor CS20 in order to supply the load IE with a stabilized output voltage UE. The supply voltage US2 is connected to the cathode of a variable zener diode IS10, its anode being at earth potential. The Type TL 431 zener diode from Motorola is particularly suitable for use as the variable zener diode IS10. The control electrode of this zener diode IS10 is connected via a resistor network RS10, RS11, RS12 and RS13 to a supply voltage to be stabilized, in this exemplary embodiment the voltage UE supplied to the load IE. Alternatively, by way of example, a supply voltage from a further secondary winding or from a further switched-mode power supply can be connected to the control electrode.

A light-emitting diode BS20 can advantageously be arranged in the forward direction between the diode DS20 and the capacitor CS20 in order to indicate the operating state. It is admittedly in the current path to a load but, since the load has only a low power consumption, this does not overload the light-emitting diode BS20. This saves any need for a series resistor. Since the light-emitting diode BS20 is arranged upstream of the smoothing capacitor CS20, it is operated by the voltage US1, which pulsates at the frequency of the switched-mode power supply. With this method of operation, it requires only a very small amount of power, in this exemplary embodiment only about 3 mW.

The switched-mode power supply in the FIGURE produces the supply voltage US1 in the on phase and the supply voltage US2, of the same polarity, in the off phase, by means of the circuit which is used here and comprises the diodes DS01, DS02, DS10 and DS20. Thus, only one of the supply voltages US1, US2 can be stabilized if the pulse-width ratio and the frequency of the oscillator IP1 vary. However, the second supply voltage US2 can in this case advantageously be used to transmit regulation information from the secondary side to the primary side.

In this case, the variable zener diode IS10 replaces an error amplifier with complex circuitry. In addition, there is no need for any further secondary winding or any additional component, for example an optocoupler, to transmit the control information.

The resistors RS10–RS14 of the resistor network via which the variable zener diode IS10 is connected to the output voltage UE to be stabilized have the following approximate values in this exemplary embodiment:

RS10:330 K
RS11:0
RS12:100 K
RS13:100 K
RS14:4.7 K

The exemplary embodiment in the FIGURE is preferably used to produce low power levels on the secondary side and has very high efficiency. The transformer Tr1 may have a very compact design, particularly because it is designed only for a low operating voltage. The switched-mode power supply is therefore particularly suitable for use as a separate standby switched-mode power supply for entertainment electronic equipment. Alternatively, it can be designed for higher power levels, and is thus also suitable, for example, for use as a DC—DC converter in conjunction with a car battery. The switched-mode power supply is started in a simple manner via the zener diode DP05.

What is claimed is:

1. Switched-mode power supply comprising:

a switching transistor having main current conducting terminals and a control input terminal, a driver stage for said switching transistor, an isolating transformer comprising a secondary winding and a primary winding having first and second terminals, a source of DC operating voltage for providing a voltage for said power supply, said switching transistor having one of its main conducting terminals coupled to a positive said source of DC operating voltage and the other of its conducting terminals coupled to said first terminal of said primary winding, said first terminal being at a higher voltage potential than said second terminal, said second terminal of said primary winding coupled to a first Zener diode and to said driver stage for providing a supply voltage from said primary winding for said driver stage, and a differentiating circuit coupled between the output of said driver stage and the control input terminal of said switching transistor for driving said switching transistor.

2. Switched mode power supply according to claim 1, wherein said differentiating circuit comprises a resistor and a capacitor coupled in series between said driver stage and said control input terminal.

3. Switched-mode power supply according to claim 2, wherein a resistor is coupled between said operating voltage and the control input terminal of said switching transistor.

4. Switched-mode power supply according to claim 3, wherein said driver stage produces square wave pulses for driving the switching transistor, and in that the time constant of said differentiating circuit is chosen such that the differentiation of the square-wave pulses produces suitable positive and negative pulses for controlling said switching transistor.

5. Switched-mode power supply according to claim 1, wherein said switched-mode power supply comprises a series circuit, which is coupled between said source of DC operating voltage and ground and which comprises said first and a second Zener diode, in order to stabilize said supply voltage as well as said DC operating voltage.

6. Switched-mode power supply according to claim 5, wherein said second Zener diode, which is connected to said DC operating voltage, provides the starting current for said driver stage.

7. Switched-mode power supply comprising:

a switching transistor having main current conducting terminals and a control input terminal, a driver stage for said switching transistor, an isolating transformer comprising a secondary winding and a primary winding having first and second terminals, a source of DC operating voltage for providing a voltage for said power supply, said switching transistor having one of its main conducting terminals coupled to a positive said source of DC operating voltage and the other of its conducting terminals coupled to said first terminal of said primary winding at a hither voltage potential than said second terminal, a differentiating circuit coupled between the output of said driver stage and the control input terminal of said switching transistor for driving said switching transistor, said differentiating circuit comprising a resistor and a capacitor coupled in series between said driver stage and said control input terminal, said driver stage producing square wave pulses for driving said switching transistor, and in that the time constant of said differentiating circuit is chosen such that the differentiation of the square-wave pulses produces suitable positive and negative pulses for controlling said switching transistor.

8. Switched-mode power supply according to claim 7, wherein a resistor is coupled between said DC operating voltage and said control input terminal of said switching transistor.

9. Switched-mode power supply according to claim 7, wherein said second terminal of said primary winding is coupled to a first Zener diode and to said driver stage for providing a supply voltage from said primary winding for said driver stage, and said switched-mode power supply comprises a series circuit, which is coupled between said source of DC operating voltage and ground and which comprises said first and a second Zener diode, in order to stabilize said supply voltage as well as said DC operating voltage.

10. Switched-mode power supply according to claim 9, wherein said second Zener diode, which is connected to said DC operating voltage, provides the starting current for said driver stage.

11. Switched-mode power supply comprising a switching transistor having main current conducting terminals and a control input terminal, a driver stage for said switching transistor, an isolating transformer comprising a secondary winding and a primary winding having first and second terminals, a source of DC operating voltage for providing a voltage for said power supply, said switching transistor having one of its main conducting terminals coupled to a positive side of said source of DC operating voltage and the other one of its conducting terminals coupled to said first terminal of said primary winding, said first terminal being at a higher voltage potential than the secondary winding, said second terminal of said primary winding coupled to a first Zener diode and to a supply input of said driver stage, and said Zener diode coupled to ground with its other terminal for providing a stabilized supply voltage from said primary winding for said driver stage.

* * * * *